United States Patent [19]

Sasaki

[11] Patent Number: 5,004,326
[45] Date of Patent: Apr. 2, 1991

[54] MAGNETO-OPTICAL INFORMATION REPRODUCING APPARATUS HAVING A POLARIZING BEAM SPLITTER DISPOSED WITH AN INCLINATION OF 45 DEGREES

[75] Inventor: Kenichi Sasaki, Tokyo, Japan

[73] Assignee: Canon Kabushiki Kaisha, Tokyo, Japan

[21] Appl. No.: 317,958

[22] Filed: Mar. 2, 1989

[30] Foreign Application Priority Data

Mar. 3, 1988 [JP] Japan ................... 63-48772

[51] Int. Cl.⁵ .............................. G02F 1/29
[52] U.S. Cl. .................. 350/375; 360/114; 365/122; 369/110
[58] Field of Search ............ 350/370, 405, 394, 173, 350/374, 375, 382, 387, 389, 393, 394, 406; 356/369, 351; 360/114; 365/122; 369/110

[56] References Cited

U.S. PATENT DOCUMENTS

| | | | |
|---|---|---|---|
| 3,532,891 | 10/1970 | Simmons et al. | 350/387 |
| 4,558,440 | 12/1985 | Tomita | 369/13 |
| 4,561,032 | 12/1985 | Matsumoto et al. | 360/114 |
| 4,569,035 | 2/1986 | Tomita | 365/122 |
| 4,573,149 | 2/1986 | Deguchi et al. | 369/13 |
| 4,580,878 | 4/1986 | Tsuji | 350/394 |
| 4,702,603 | 10/1987 | Augustyn | 350/394 |
| 4,769,800 | 9/1988 | Moser et al. | 369/32 |

FOREIGN PATENT DOCUMENTS

| | | |
|---|---|---|
| 0214529 | 3/1987 | European Pat. Off. . |
| 0260114 | 3/1988 | European Pat. Off. . |
| 2598521 | 11/1987 | France . |
| 233448 | 10/1986 | Japan . |

Primary Examiner—Bruce Y. Arnold
Assistant Examiner—J. P. Ryan
Attorney, Agent, or Firm—Fitzpatrick, Cella, Harper & Scinto

[57] ABSTRACT

A magneto-optical information reproducing apparatus includes a device for applying a light beam polarized in a predetermined direction to a recording medium on which information is magnetically recorded, a first divider for dividing the reflected or transmitted light beam from the medium modulated into a polarized state in conformity with the information by magneto-optical effect into two light beams polarized in directions orthogonal to each other, the first divider being disposed so that the directions of polarization of the divided two light beams form an angle of 45° with respect to the predetermined direction of polarization of the applied light beam, and a detector for detecting the divided two light beams.

21 Claims, 3 Drawing Sheets

MAGNETO-OPTICAL INFORMATION REPRODUCING APPARATUS HAVING A POLARIZING BEAM SPLITTER DISPOSED WITH AN INCLINATION OF 45 DEGREES

BACKGROUND OF THE INVENTION

1. Field of the Invention

The present invention relates to a magneto-optical information reproducing apparatus which utilizes the magneto-optical effect to reproduce information magnetically recorded on a recording medium.

2. Related Background Art

In recent years, optical memories for effecting recording and reproduction by a laser beam have been actively studied and developed for practical use as high-density recording memories. Of these, magneto-optical disks capable of erasing and re-writing have been regarded as promising with optical disks exclusively for reproduction typified by compact disks and direct read after write (DRAW) type optical disks. Magneto-optical disks are such that information is magnetically recorded by the utilization of the localized temperature size of a magnetic thin film caused by the application of a laser spot thereto and the information is reproduced by the magneto-optical effect (particularly the Kerr effect). The Kerr effect refers to the phenomenon that the plane of polarization is rotated when light is reflected by a magnetic recording medium.

The basic construction of a magneto-optical disk apparatus according to the prior art is shown in FIG. 1 of the accompanying drawings. In FIG. 1, reference numeral 1 designates a semiconductor laser, reference numeral 2 denotes a collimator lens, reference numerals 11 and 12 designate half-mirrors, reference numeral 4 denotes an objective lens, reference numeral 6 designates a magneto-optical recording medium, reference numerals $7_1$ and $7_2$ denote analyzers, reference numeral 8 designates a condensing lens, and reference numerals $9_1$ and $9_2$ denote photodetectors. The direction of P-polarization is parallel to the plane of the drawing sheet, and the direction of S-polarization is perpendicular to the plane of the drawing sheet.

Description will now be made of a case where magneto-optical information is reproduced in such apparatus. A light beam emitted from the semiconductor laser 1 as a rectilinearly polarized light in the direction of P-polarization is collimated by the collimator lens 2 and passes through the half-mirror 11. If the P-polarized component amplitude transmittance is $t_p$ and the S-polarized component amplitude transmittance is $t_s$, $|t_p|^2 = |t_s|^2 = 0.5$ in the half-mirror 11. The light beam is imaged as a minute spot on the magneto-optical recording medium 6 by the objective lens 4. When a magnetic section (pit) is pre-formed on the medium 6, as shown in FIG. 2 of the accompanying drawings, the reflected light from the medium 6 is subjected to the rotation of the plane of polarization of $\pm\theta_k$ by the Kerr effect in conformity with whether the direction of magnetization of the spot-applied area is upward or downward. Here, if the P-polarized component of the amplitude reflectance of the recording medium 6 is R and the S-polarized component is K, the following equation is established:

$$\theta_k = \frac{|K|}{|R|} \quad (1)$$

The magneto-optically modulated reflected light is again collimated by the objective lens 4 and reflected by the half-mirror 11, whereafter it is made into a convergent light beam by the condensing lens 8 and divided by the half-mirror 12, and the divided lights pass through the analyzers $7_1$ and $7_2$, respectively, and are detected as intensity-modulated light beams by the photodetectors $9_1$ and $9_2$. That is, as shown in FIG. 2, the angle of the optic axis of the analyzer with respect to the direction of P-polarization is $\pm\theta_A$ on the transmission side and the reflection side, and the light beam is analyzed as a regular projection of the amplitude thereof onto the optic axis of the analyzer.

Considering that the Kerr rotation angle is of the order of 1° and that the magneto-optical modulated component is of a very minute amount, it is necessary that the azimuth angle $\theta_A$ of the optic axis of the analyzer be set to such an optimum position that the C/N (the ratio between the carrier wave and the noise) of the detection signal becomes maximum. For example, in U.S. Pat. No. 4,569,035 issued on Feb. 4, 1986, there is shown an example of an apparatus using as a photodetector an avalanche photodiode (APD) or the like having a multiplying action wherein the azimuth of the transmission axis (the optic axis) of the analyzer is optimized. On the other hand, in an apparatus using as a photodetector a PIN photodiode or the like having no multiplying action, the azimuth angle $\theta_A$ of the optic axis of the analyzer has been set to 45° so that the signal light becomes maximum. When the Kerr rotation angle is $\pm\theta_k$, if the quantity of light incident on the recording medium is $I_0$, the quantities of light passing through the analyzers on the transmission side and the reflection side and entering the respective photodetectors are:

$$\begin{cases} \text{Transmission side: } I_t = \frac{1}{4} I_0 (|R|\cos 45° + |K|\sin 45°)^2 \\ \text{Reflection side: } I_r = \frac{1}{4} I_0 (|R|\cos 45° - |K|\sin 45°)^2 \end{cases} \quad (2)$$

Since $\theta_k \sim 1°$, $|R|^2 >> |K|^2$ is established and thus, equation (2) can be expressed as follows:

$$\begin{cases} I_t = \frac{1}{4} I_0 (|R|^2 + 2|R||K|) \\ I_r = \frac{1}{4} I_0 (|R|^2 - 2|R||K|) \end{cases} \quad (3)$$

In equation (3), the second term in the parentheses is the magneto-optical modulated component and the first term in the parentheses is the non-modulated component. These lights are photoelectrically converted by the photodetectors $9_1$ and $9_2$, respectively, and then differentially detected by a differential circuit, not shown, whereby a magneto-optical signal is obtained.

On the other hand, a magneto-optical information reproducing apparatus using a polarizing beam splitter instead of the half-mirror 11 shown in FIG. 1 to improve the C/N of the above-mentioned reproducing signal is proposed in U.S. Pat. No. 4,561,032 issued on Dec. 24, 1985. Further, an example in which the polarizing characteristic of this polarizing beam splitter is set so that C/N is maximum is disclosed in U.S. Pat. No. 4,558,440 issued on Dec. 10, 1985.

Also, U.S. Pat. No. 4,573,149 issued on Nov. 25, 1986 discloses an example using a half wavelength plate and a polarizing beam splitter (hereinafter referred to as PBS) instead of the half-mirror 12 and the analyzers $7_1$ and $7_2$. This example will hereinafter be described with reference to FIG. 3 of the accompanying drawings.

In FIG. 3, a light beam emitted from a light source (a laser diode) 27 enters a recording medium 31 via a beam splitter 24, a mirror 25 and an objective lens 26. The light beam reflected by the medium 31 then again passes to the beam splitter 24 via the objective lens 26 and the mirror 25, and is reflected toward a condensing lens 23 by the beam splitter 24. The reference numeral 33 indicates the direction of polarization when the direction of polarization when the light beam is emitted from the light source 27 is not subjected to the Kerr effect but intactly advances toward the condensing lens 23. When the light beam is reflected by a medium 31, the light beam enters the condensing lens 23 with the plane of polarization rotated by an angle of Kerr rotation $\pm\theta_k$ with respect to the direction indicated by reference numeral 33 due to the Kerr effect. The plane of polarization is rotated by 45° by a half wavelength plate 34 whose optic axis is inclined by 22.5° with respect to the direction indicated by reference numeral 33 and is polarized in a direction indicated by reference numeral 35. Part of the light beam thus polarized is reflected by a beam splitter 22 and received by a servo signal detecting sensor (a photoelectric conversion element) 28, and on the other hand, the light beam transmitted through the beam splitter 22 enters PBS 21. The light beam which has entered the PBS 21 is divided into two light beams polarized in directions orthogonal to each other, and these light beams are detected by magneto-optical signal detecting sensors (photoelectric conversion elements) 29 and 30. By taking the difference between the detection signals of these sensors, the information recorded on said medium is reproduced.

However, in the construction shown in FIG. 3, the number of parts is great and the azimuths of the half wavelength plate 34 and the PBS 21 must be strictly adjusted relative to the direction of polarization of the light beam and therefore, assembly has not been easy.

SUMMARY OF THE INVENTION

It is the object of the present invention to solve the above-noted problems peculiar to the prior art and to provide a magneto-optical information reproducing apparatus which is easy to assemble and adjust.

The above object of the present invention is achieved by a magneto-optical information reproducing apparatus comprising:

means for applying a light beam polarized in a predetermined direction to a recording medium on which information is magnetically recorded;

means for dividing the reflected or transmitted light beam from said medium modulated into a polarized state in conformity with said information by the magneto-optical effect into two light beams polarized in directions orthogonal to each other, said means being disposed so that the directions of polarization of said divided two light beams form an angle of 45° with respect to the predetermined direction of polarization of said applied light beam; and detecting means for detecting said divided two light beams.

DESCRIPTION OF THE PREFERRED EMBODIMENTS

Figure 1:
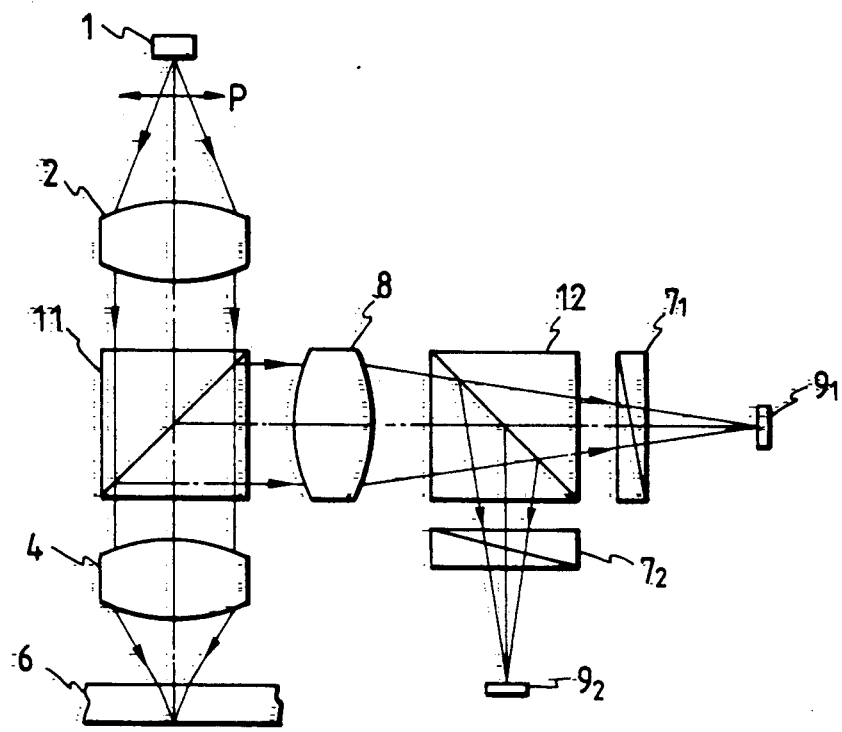
FIG. 1 is a schematic view showing an example of the construction of a magneto-optical information reproducing apparatus according to the prior art.
Figure 2:
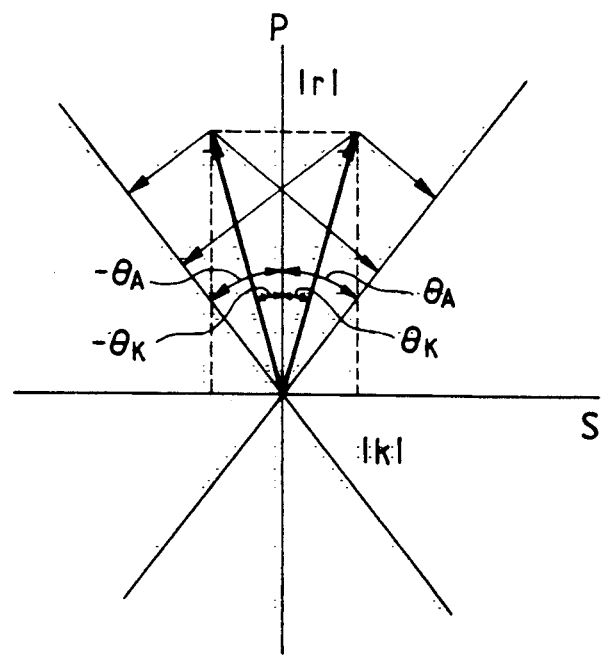
FIG. 2 illustrates the principle of detection of a magneto-optical signal.
Figure 3:
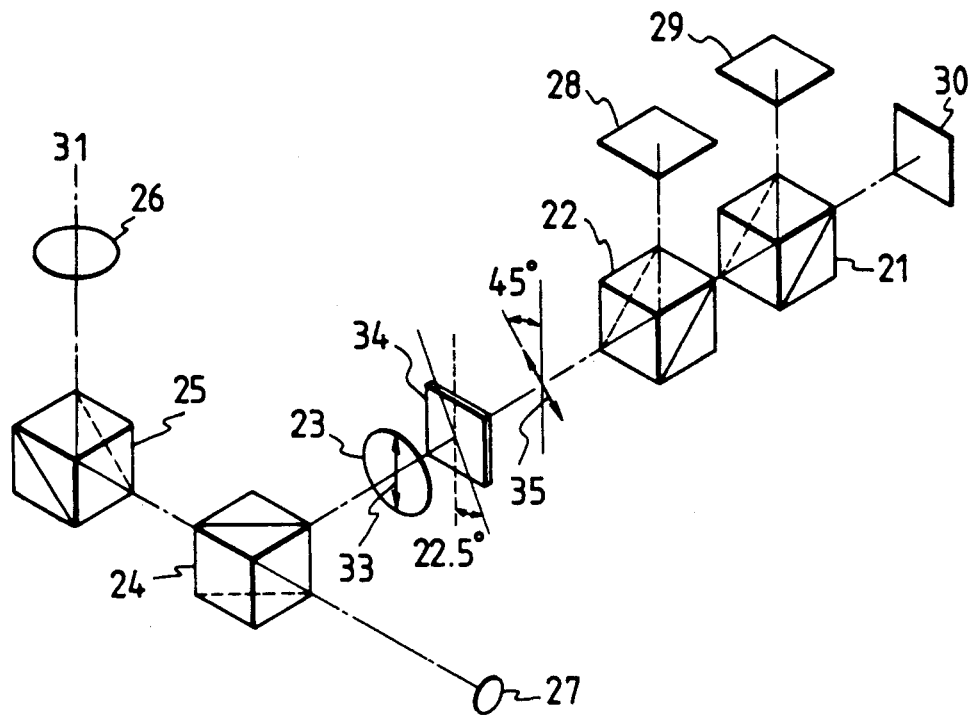
FIG. 3 is a schematic perspective view showing another example of the construction of the magneto-optical information reproducing apparatus according to the prior art.
Figure 4:
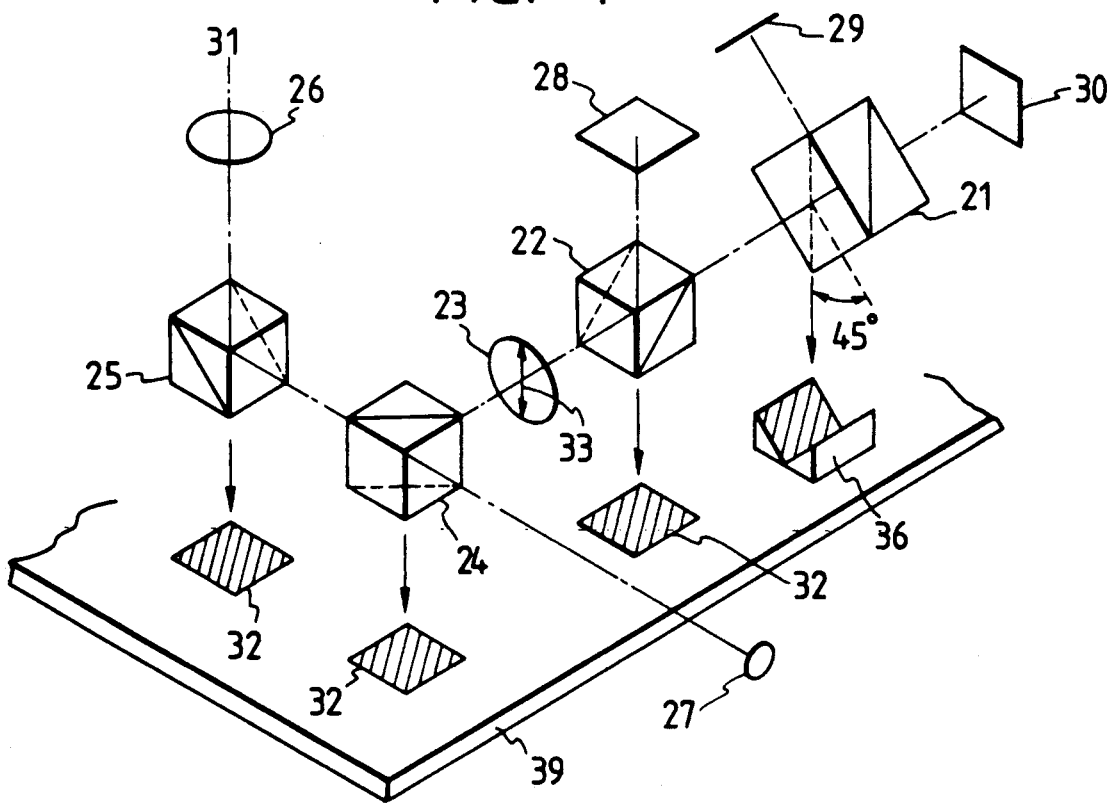
FIGS. 4 and 5 are a schematic perspective view and a side view, respectively, showing an embodiment of the magneto-optical information reproducing apparatus of the present invention.
Figure 5:
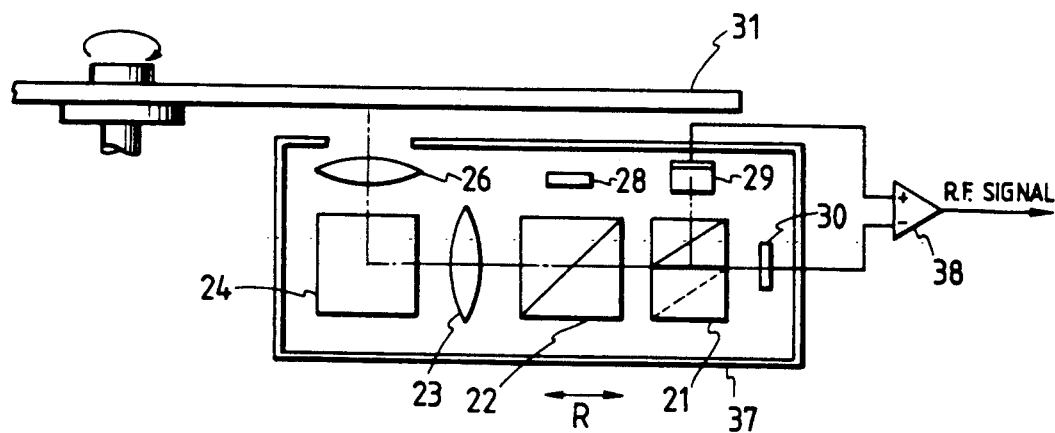

FIGS. 4 and 5 are a schematic perspective view and a side view, respectively, showing an embodiment of the magneto-optical information reproducing apparatus of the present invention. In these figures, members similar to those in FIG. 3 are given similar reference numerals.

In FIG. 4, reference numeral 31 designates a magneto-optical information recording medium. The recording medium 31 is exemplarily shown as a disk rotated by a spindle motor, not shown. A light beam emitted from a laser diode 27 which is a light source and polarized in a predetermined direction indicated by arrow 33 is transmitted through a beam splitter 24, is reflected by a deflecting mirror 25 and is condensed on the medium 31 by an objective lens 26. The beam splitter 24 is for separating the applied light beam to the medium and the reflected light beam from the medium. This beam splitter 24, as described in the aforementioned U.S. Pat. No. 4,561,032, may be designed so as to have such a characteristic which increases a polarized component in a direction orthogonal to the polarized component of the reflected light beam in the direction of arrow 33 relative to the latter polarized component.

The light beam applied to the medium 31 is modulated into its polarized state in conformity with the information recorded on the medium, by the magneto-optical effect and is reflected. This reflected light beam again passes through the objective lens 26 and mirror 25 and is reflected by the beam splitter 24. The reflected light beam is further converged by a condensing lens 23, and part thereof is caused to branch off by a beam splitter 22 for a servo sensor and is received by a servo signal detecting sensor 28. The sensor 28 detects servo signals such as a focusing error signal and a tracking error signal from the branching-off light beam by a known method.

The light beam transmitted through the beam splitter 22 enters a polarizing beam splitter (PBS) 21 for detecting a magneto-optical signal, and is divided thereby into two light beams polarized in directions orthogonal to each other. The divided light beams are received by photoelectric conversion elements (hereinafter referred to as RF sensors) 29 and 30 for detecting a magneto-optical signal. The PBS 21 is disposed so that the directions of polarization of the two light beams divided thereby form an angle of 45° with respect to the predetermined direction of polarization (indicated by arrow 33) of the applied light beam. The PBS 21 is formed by joining two pyramidal prisms together and providing an interference film on the joined surface thereof. By P-polarized light beam transmitted and S-polarized light being reflected on the joined surface, the light beam is divided. The thus constructed PBS 21 has a cube-like configuration. Accordingly, in the present embodiment, the PBS 21 is held in a state in which it has been rotated by 45° about the optic axis of the reflected light beam.

The signals detected by the RF sensors 29 and 30 are modulated into opposite phases and the same amplitude corresponding to the information recorded on the medium 31. Accordingly, by differentiating these output signals by a differential amplifier 38, any noise component is eliminated and a reproduction signal (RF signal) of a high C/N ratio is obtained.

Each of the elements is contained in an optical head carriage 37. The carriage 37 is driven in the direction of arrow R (the radial direction of the medium 31) by a motor, not shown. The mirror 25 and the beam splitters 22 and 24 shown in FIG. 4 are adhesively or otherwise secured to a mounting surface 32 provided on the frame 39 of the carriage 37. On the other hand, the PBS 21 is adhesively or otherwise secured to a mount 36 provided on the frame 39 and having a V-shaped mounting surface. The mounting surface of the mount 36 is formed by two surfaces including the direction of the optic axis of the light beam entering the PBS 21 and the directions of polarization of the light beams divided by the PBS 21.

Thus, according to the present invention, a half wavelength plate becomes unnecessary and the azimuth of polarization of the PBS may simply be adjusted and therefore, assembly becomes very easy.

Figure 6:
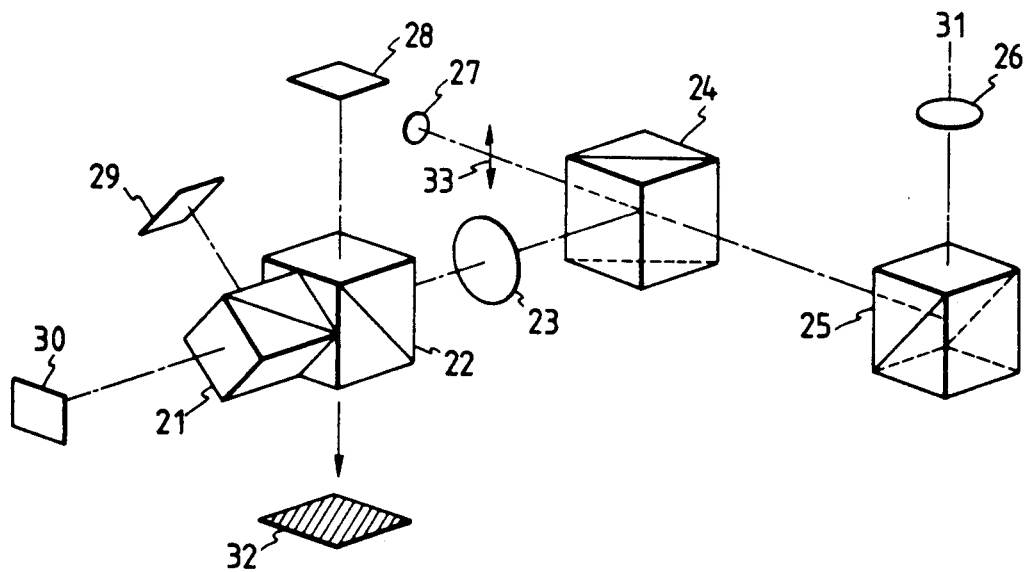
FIG. 6 is a schematic perspective view showing another embodiment of the present invention.

FIG. 6 is a schematic perspective view showing another embodiment of the present invention. In FIG. 6, members similar to those in FIG. 4 are given similar reference numerals and need not be described in detail.

In the present embodiment, the PBS 21 is adhesively secured to and formed integrally with the beam splitter 22. As compared with the embodiment shown in FIG. 4, the present embodiment further has the advantage that the mount 36 is unnecessary.

The present invention permits various applications besides the above-described embodiments. For example, the beam splitter 22 may be a polarizing beam splitter to enhance the C/N ratio of the reproduction signal. In such a case, the beam splitter 22 is designed so as to increase the polarized component in a direction orthogonal to the component of the applied light beam to the medium in the direction of polarization, of the light beam entering the beam splitter 22, relative to the latter component. Also, when the medium is of the transmission type, design is made such that information is reproduced from the light beam transmitted through the medium. Further, the shape of the medium is not limited to the disk-like shape, but may be any shape such as a tape-like shape or a card-like shape. The present invention covers all such applications without departing from the scope thereof as defined in the appended claims.

I claim:

1. A magneto-optical information reproducing apparatus comprising:
    means for applying a light beam polarized in a predetermined direction to a recording medium on which information is magnetically recorded;
    first dividing means for dividing the reflected or transmitted light beam from the medium modulated into a polarized state in conformity with the information by the magneto-optical effect into two light beams polarized in directions orthogonal to each other, said first dividing means being disposed so that the directions of polarization of the divided two light beams form an angle of 45° with respect to the predetermined direction of polarization of the applied light beam;
    detecting means for detecting the divided two light beams; and
    supporting means for supporting said first dividing means, said supporting means being provided with two surfaces, at least one of which includes the directions of polarization of the divided light beams and wherein an outer surface of said first dividing means contacts the at least one surface of said supporting means.

2. A magneto-optical information reproducing apparatus according to claim 1, further comprising means for differentiating detection outputs of the divided light beams output from said detecting means.

3. A magneto-optical information reproducing apparatus according to claim 1, wherein said first dividing means comprises a polarizing beam splitter.

4. A magneto-optical information reproducing apparatus according to claim 3, wherein said polarizing beam splitter comprises prisms joined together and is of a cube-like shape.

5. A magneto-optical information reproducing apparatus according to claim 4, wherein said supporting means has a V-shaped mount surface bearing against the outer surface of said polarizing beam splitter.

6. A magneto-optical information reproducing apparatus according to claim 1, further comprising second dividing means for separating the light beam reflected by said medium from the applied light beam and directing it to said first dividing means.

7. A magneto-optical information reproducing apparatus according to claim 6, wherein said second dividing means comprises a polarizing beam splitter for increasing a polarized component in a direction orthogonal to the component of the light beam entering said second dividing means in the direction of polarization of the applied beam to the medium, relative to the latter component, and directing it to said first dividing means.

8. A magneto-optical information reproducing apparatus according to claim 1, wherein said applying means comprises a light source and an optical system for condensing the light emitted from said light source on said medium.

9. A magneto-optical information reproducing apparatus comprising:
    a light source for emitting a light beam;
    an optical system for condensing the light beam emitted from said light source on a recording medium on which information is magnetically recorded;
    a first polarizing beam splitter for dividing the reflected or transmitted light beam from the medium modulated into a polarized state in conformity with the information by the magneto-optical effect into two light beams polarized in directions orthogonal to each other, said first polarizing beam splitter being disposed so that the directions of polarization of the divided two light beams form an angle of 45° with respect to the predetermined direction of polarization of the applied light beam;

a detecting circuit for detecting the divided two light beams; and an optical head carriage provided with two surfaces, at least one of which includes the directions of polarization of the divided light beams and wherein said first polarizing beam splitter has an outer surface contacting the at least one surface of said carriage.

10. A magneto-optical information reproducing apparatus according to claim 9, further comprising a circuit for differentiating detection outputs of the divided light beams output from said detecting circuit.

11. A magneto-optical information reproducing apparatus according to claim 9, wherein said first polarizing beam splitter comprises prisms joined together and is of a cube-like shape.

12. A magneto-optical information reproducing apparatus according to claim 9, wherein said carriage has a V-shaped mount surface bearing against the outer surface of said first polarizing beam splitter.

13. A magneto-optical information reproducing apparatus according to claim 9, further comprising a beam splitter for separating the light beam reflected by the medium from the applied beam and directing it to said first polarizing beam splitter.

14. A magneto-optical information reproducing apparatus according to claim 13, wherein said beam splitter comprises a second polarizing beam splitter for increasing a polarized component in a direction orthogonal to the component of the light beam entering said beam splitter in the direction of polarization of the applied beam to the medium, relative to the latter component, and directing it to said first polarizing beam splitter.

15. A magneto-optical information reproducing apparatus comprising:

means for applying a light beam polarized in a predetermined direction to a recording medium on which information is magnetically recorded;

first dividing means for dividing the reflected or transmitted light beam from the medium modulated into a polarized state in conformity with the information by the magneto-optical effect into two light beams polarized in directions orthogonal to each other, said first dividing means being disposed so that the directions of polarization of the divided two light beams form an angle of 45° with respect to the predetermined direction of polarization of the applied light beam;

detecting means for detecting the divided two light beams; and second dividing means for dividing part of the light beam before entering said first dividing means, said second dividing means being integrally formed with said first dividing means.

16. A magneto-optical information reproducing apparatus according to claim 15, wherein said first and second dividing means comprise cube-shaped first and second beam splitters, respectively, said first beam splitter being rotated by 45° about the optic axis of the light beam from the medium and joined to said second beam splitter.

17. A magneto-optical information reproducing apparatus according to claim 15, wherein said second dividing means comprises a polarizing beam splitter for increasing a polarized component in a direction orthogonal to the component of the light entering the second dividing means in the direction of polarization of the applied light beam to said medium, relative to the latter component, and directing it to said first dividing means.

18. A magneto-optical information reproducing apparatus according to claim 15, further comprising support means for supporting said second dividing means, said support means having a surface arranged orthogonal to the predetermined polarization direction.

19. A magneto-optical information reproducing apparatus comprising:

a light source for emitting a light beam;

an optical system for condensing the light beam emitted from said light source on a recording medium on which information is magnetically recorded;

a first polarizing beam splitter for dividing the reflected or transmitted light beam from the medium modulated into a polarized state in conformity with the information by the magneto-optical effect into two light beams polarized in directions orthogonal to each other, said first polarizing beam splitter being disposed so that the directions of polarization of the divided two light beams form an angle of 45° with respect to the predetermined direction of polarization of the applied light beam;

a detecting circuit for detecting the divided two light beams; and a beam splitter for dividing part of the light beam before entering said first polarizing beam splitter, said beam splitter being integrally formed with said first polarizing beam splitter.

20. A magneto-optical information reproducing apparatus according to claim 19, wherein said beam splitter comprises a second polarizing beam splitter for increasing a polarized component in a direction orthogonal to the component of the light beam entering said beam splitter in the direction of polarization of the applied beam to the medium, relative to the latter component, and directing it to said first polarizing beam splitter.

21. A magneto-optical information reproducing apparatus according to claim 19, further comprising support means for supporting said beam splitter, said support means having a surface arranged orthogonal the predetermined polarization direction.

* * * * *

UNITED STATES PATENT AND TRADEMARK OFFICE
CERTIFICATE OF CORRECTION

PATENT NO. : 5,004,326
DATED : April 2, 1991
INVENTOR(S) : Kenichi Sasaki

It is certified that error appears in the above-identified patent and that said Letters Patent is hereby corrected as shown below:

COLUMN 2:

Line 35, "$\pm\theta k$" should read --$+\theta k$--.

COLUMN 6:

Line 38, "said" should read --the--.

COLUMN 8:

Line 12, "light" should read --light beam--.

Line 14, "said" should read --the--.

Line 54, "orthogonal" should read --orthogonal to--.

Signed and Sealed this

Twenty-seventh Day of October, 1992

Attest:

DOUGLAS B. COMER

*Attesting Officer*  *Acting Commissioner of Patents and Trademarks*